US012358307B2

(12) United States Patent
Morisawa

(10) Patent No.: US 12,358,307 B2
(45) Date of Patent: Jul. 15, 2025

(54) MEDIUM TRANSPORT DEVICE AND RECORDING DEVICE

(71) Applicant: SEIKO EPSON CORPORATION, Tokyo (JP)

(72) Inventor: Ryoichi Morisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 227 days.

(21) Appl. No.: 18/333,770

(22) Filed: Jun. 13, 2023

(65) Prior Publication Data

US 2023/0406013 A1 Dec. 21, 2023

(30) Foreign Application Priority Data

Jun. 15, 2022 (JP) ................................ 2022-096323

(51) Int. Cl.
*B41J 13/00* (2006.01)
*B41J 2/01* (2006.01)
*B41J 13/02* (2006.01)
*B65H 3/06* (2006.01)

(52) U.S. Cl.
CPC ............ *B41J 13/0009* (2013.01); *B41J 2/01* (2013.01); *B41J 13/02* (2013.01); *B65H 3/0661* (2013.01)

(58) Field of Classification Search
CPC ................. B65H 5/062; B65H 3/0661; B65H 2404/144; B65H 29/125; B41J 13/02
See application file for complete search history.

(56) References Cited

U.S. PATENT DOCUMENTS

| | | | | |
|---|---|---|---|---|
| 9,956,795 B2 * | 5/2018 | Ogimura | B41J 13/025 | |
| 11,745,524 B2 * | 9/2023 | Nomoto | B41J 29/38 | 347/104 |
| 2006/0180991 A1 * | 8/2006 | Nakahata | B65H 3/5261 | 271/121 |
| 2008/0150221 A1 * | 6/2008 | Sugiyama | B65H 3/0676 | 271/202 |
| 2009/0295067 A1 * | 12/2009 | Yanagishita | B65H 3/0684 | 271/10.12 |
| 2013/0241144 A1 | 9/2013 | Yasukawa | | |
| 2021/0138804 A1 * | 5/2021 | Sasaki | B41J 11/04 | |

FOREIGN PATENT DOCUMENTS

| | | |
|---|---|---|
| JP | 2009-126679 A | 6/2009 |
| JP | 2013-193838 A | 9/2013 |

* cited by examiner

*Primary Examiner* — John Zimmermann
(74) *Attorney, Agent, or Firm* — WORKMAN NYDEGGER

(57) ABSTRACT

A medium transport device includes a medium mounting portion, a feeding roller configured to feed a first medium, a separation roller configured to separate the first medium and a second medium, a transport roller pair configured to transport the first medium sent from the feeding roller, and a driving mechanism configured to drive the separation roller. The driving mechanism causes the separation roller to rotate in a second rotational direction and applies a rotational load having a first load value to rotation of the separation roller in a first rotational direction, and switches, after a leading edge of the first medium passes through the transport roller pair and before a trailing edge of the first medium passes through between the feeding roller and the separation roller, a rotational load applied to the separation roller to a second load value that is lower than the first load value.

8 Claims, 6 Drawing Sheets

MEDIUM TRANSPORT DEVICE AND RECORDING DEVICE

The present application is based on, and claims priority from JP Application Serial Number 2022-096323, filed on Jun. 15, 2022, the disclosure of which is hereby incorporated by reference herein in its entirety.

BACKGROUND

1. Technical Field

The present disclosure relates to a medium transport device and a recording device.

2. Related Art

For example, as in JP-A-2009-126679, there is an inkjet printer serving as one example of a recording device configured to perform recording on a sheet serving as one example of a medium. The inkjet printer includes a paper-feeding device serving as one example of a medium transport device. The paper-feeding device includes a pick-up roller, a feed roller serving as one example of a feeding roller, a retard roller serving as one example of a separation roller, and a transport roller pair.

The feeding device is configured to separate sheets sent out by the pick-up roller into individual sheets, and then transport them by the transport roller pair. The feeding device reduces the load of transportation by making the feed roller spaced apart from sheets transported by the transport roller pair, and also holds the next sheet with the pick-up roller to prevent multiple media from being fed at one time.

The feeding device in JP-A-2009-126679 moves the feed roller with driving of a solenoid. This makes the structure complicated.

SUMMARY

A medium transport device that solves the problem described above includes a medium mounting portion at which a first medium and a second medium are mounted, a feeding roller configured to send the first medium in a transport direction, a separation roller configured to nip the first medium between the feeding roller and the separation roller, and separate the first medium and the second medium, a transport roller pair configured to transport the first medium sent from the feeding roller, and a driving mechanism configured to drive the separation roller, in which the separation roller is rotatable in a first rotational direction in which the first medium is sent in the transport direction, and also in a second rotational direction that is opposite from the first rotational direction, the driving mechanism causes the separation roller to rotate in the second rotational direction, the driving mechanism applies a rotational load having a first load value to rotation of the separation roller in the first rotational direction, and switches, after a leading edge of the first medium passes through the transport roller pair and before a trailing edge of the first medium passes through between the feeding roller and the separation roller, a rotational load applied to the separation roller from the first load value to a second load value that is lower than the first load value.

A recording device that solves the problem described above includes the medium transport device, and a recording unit configured to perform recording on the first medium.

DESCRIPTION OF EXEMPLARY EMBODIMENTS

Embodiment

Figure 1:
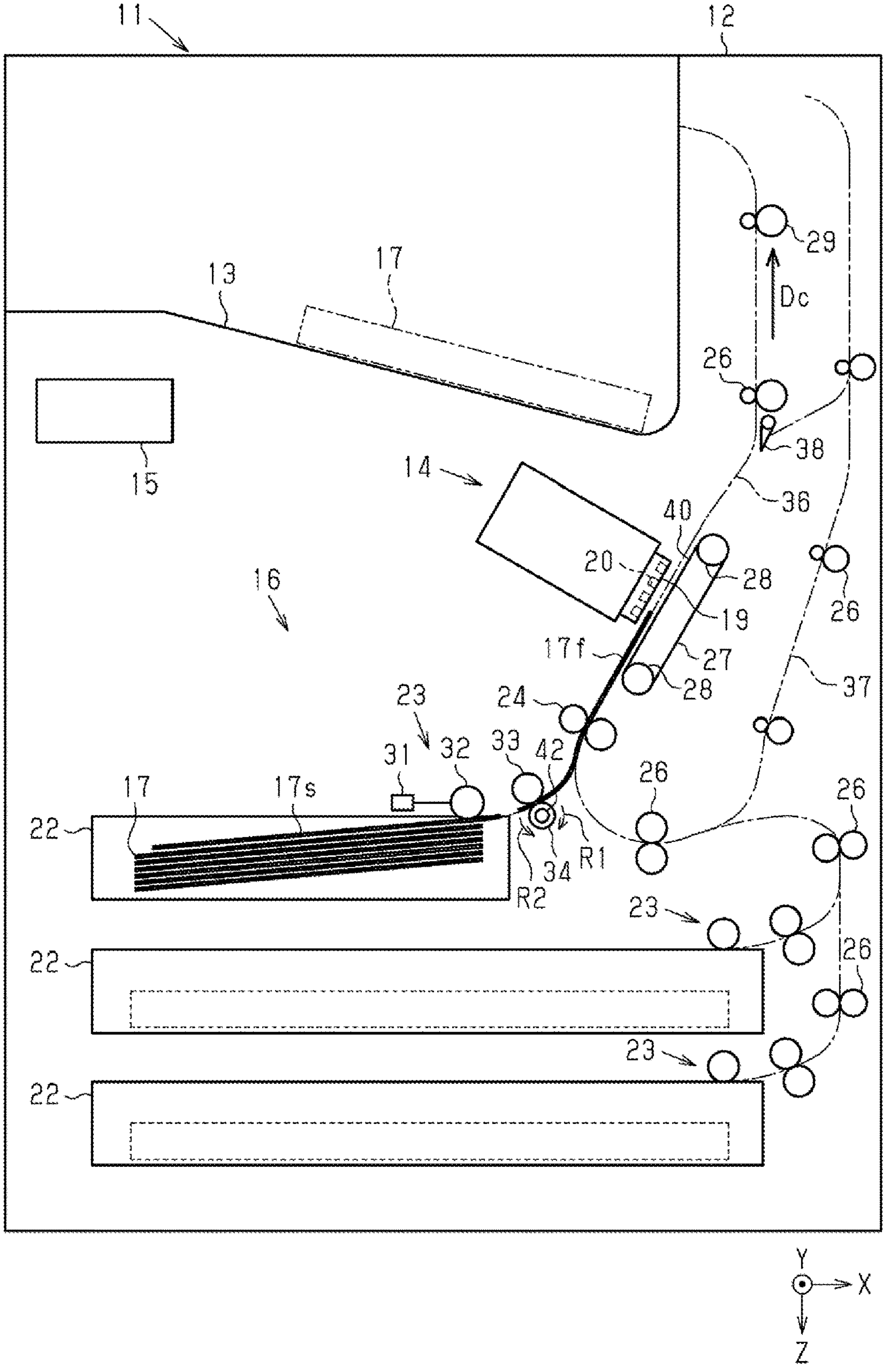
FIG. 1 is a schematic view illustrating an embodiment of a recording device.

Below, one embodiment of a medium transport device and a recording device will be described with reference to the drawings. A recording device according to the present embodiment is, for example, an ink jet-type printer configured to jet ink serving as one example of a liquid to a medium such as a sheet to perform printing. In the drawings, on the assumption that a recording device 11 is placed on a horizontal plane, the direction of the gravity is indicated as the Z-axis, and directions along the horizontal plane are indicated as the X-axis and the Y-axis. The X-axis, the Y-axis, and the Z-axis are perpendicular to each other.

Recording Device

As illustrated in FIG. 1, the recording device 11 may include a housing 12, a stacker 13, a recording unit 14, a control unit 15, and a medium transport device 16.

The housing 12 accommodates various types of configurations of the recording device 11. Specifically, the housing 12 accommodates the recording unit 14, the control unit 15, and the medium transport device 16.

The stacker 13 receives a medium 17 transported by the medium transport device 16. The stacker 13 is able to carry a plurality of media 17 on which recording has been done. In the present embodiment, two media 17 of the plurality of media 17 that are consecutively transported are also referred to as a first medium 17*f* or a second medium 17*s*. The first medium 17*f* is a medium 17 that is transported first. The second medium 17*s* is the next medium 17 that is transported after the first medium 17*f*. In the following description, when the first medium 17*f* and the second medium 17*s* are not treated separately, they are also simply referred to as a medium 17.

The recording unit 14 may include a nozzle surface 19. A plurality of nozzles 20 are opened in the nozzle surface 19. The recording unit 14 may be provided such that the nozzle surface 19 is sloped relative to the horizontal plane. The recording unit 14 performs recording on the medium 17 that is being transported, such that a liquid is jetted from the nozzles 20. That is, the recording unit 14 may perform recording on the first medium 17*f*. After performing recording on the first medium 17*f*, the recording unit 14 may perform recording on the second medium 17*s*. The recording unit 14 according to the present embodiment is a line head configured to perform, in a stopped state, recording on the transported medium 17.

The control unit 15 comprehensively controls driving of each mechanism in the recording device 11 to control various types of operation performed in the recording device 11.

The control unit 15 can be configured as a circuit including α: one or more processors configured to perform various types of processes in accordance with a computer program, β: one or more dedicated hardware circuits configured to perform at least a portion of processes of various types of processes, and γ: a combination of them. For example, the hardware circuit is an integrated circuit for specific applications. The processor includes a CPU and a memory such as a RAM and ROM, and stores a program code or an instruction configured to cause the CPU to execute a process. The memory, that is, a computer readable medium includes any type of readable medium that a general or dedicated computer can access.

Medium Transport Device

The medium transport device 16 includes a medium mounting portion 22, a feeding mechanism 23, and a transport roller pair 24. The medium transport device 16 may include a plurality of media mounting portion 22, and feeding mechanisms 23, of which number is equal to the number of the medium mounting portion 22. The medium transport device 16 may include a delivering roller pair 26, a transporting belt 27, a pair of pulleys 28, and an ejecting roller pair 29.

From a corresponding medium mounting portion 22, the feeding mechanism 23 feeds a medium 17 accommodated in this medium mounting portion 22. This "feeding" represents sending out the medium 17 from the medium mounting portion 22 to a transport path 36 one by one. The feeding mechanism 23 may include a movement mechanism 31, a pick-up roller 32, a feeding roller 33, and a separation roller 34.

The transport roller pair 24, the delivering roller pair 26, and the ejecting roller pair 29 each include a roller that comes into contact with the front surface of the medium 17 and a roller that comes into contact with the rear surface of the medium 17. One of these two rollers is a driving roller that is rotationally driven, and the other one is a driven roller that rotates in a following manner.

In FIG. 1, the transport path 36 and an inversion path 37 where the medium 17 is transported are illustrated as the long dashed short dashed line. The transport path 36 connects the medium mounting portion 22 and the stacker 13. The inversion path 37 connects the transport path 36 downstream of the recording unit 14 and the transport path 36 upstream of the recording unit 14. When recording is performed on both sides of the medium 17, the inversion path 37 is a path used to return the medium 17 for which recording has been done on one side, toward the upstream side of the recording unit 14. The medium transport device 16 may include a flap 38 configured to switch paths where the medium 17 is transported.

The medium mounting portion 22 may be able to accommodate a plurality of media 17 in a stacked state. The first medium 17*f* and the second medium 17*s* are mounted at the medium mounting portion 22. The "mount" represents a state in which an item is mounted on something, and is a state in which this item can be moved by applying external force. When the first medium 17*f* is mounted at the medium mounting portion 22, the first medium 17*f* is located higher than the second medium 17*s*.

The transport roller pair 24 transports the first medium 17*f* sent from the feeding roller 33. The transport roller pair 24 rotates in a state of sandwiching the medium 17, thereby transporting the medium 17. One roller of the two rollers that constitute the transport roller pair 24 may be a toothed roller. When recording is performed on one side of a medium 17 and the toothed roller is a roller that comes in contact with the surface of the medium 17 on which recording is performed, it is possible to suppress a deterioration in quality of recording.

The medium transport device 16 may include a plurality of delivering roller pairs 26. The plurality of delivering roller pairs 26 may be provided in the transport path 36 and the inversion path 37. The delivering roller pair 26 rotates in a state of sandwiching the medium 17, thereby transporting the medium 17 along the transport path 36 or the inversion path 37.

The transporting belt 27 may transport the first medium 17*f* sent from the transport roller pair 24. The transporting belt 27 is a circular-shaped belt. The transporting belt 27 is stretched over the pair of pulleys 28. The transporting belt 27 rotates around the pair of pulleys 28 in association with the rotation of one pulley 28. The transporting belt 27 has a transport surface 40 configured to transport the medium 17. The transport surface 40 is a flat surface of the outer peripheral surface of the transporting belt 27, this flat surface being configured to support the medium 17, for example, with electrostatic suction. The transporting belt 27 may be provided such that the transport surface 40 is in parallel to the nozzle surface 19. The transporting belt 27 supports a portion of the medium 17 on which recording is performed by the recording unit 14. The transporting belt 27 rotates around in a state of supporting the medium 17 to transport the medium 17 in a transport direction Dc. The transport direction Dc is a direction along the transport path 36, and is a direction from the medium mounting portion 22 toward the stacker 13.

The ejecting roller pair 29 may be provided at a downstream end of the transport path 36. The ejecting roller pair 29 rotates in a state of sandwiching the medium 17, thereby ejecting, to the stacker 13, the medium 17 on which recording has been performed.

The movement mechanism 31 moves the pick-up roller 32. The movement mechanism 31 may be configured to include, for example, a solenoid, a cam, and an air cylinder. The pick-up roller 32 according to the present embodiment is able to change the position between a contact position illustrated in FIG. 3 and a separated position illustrated in FIG. 6. The contact position is a position at which contact is made with the first medium 17*f*. The separated position is a position at which the component is separated from the first medium 17*f*. The pick-up roller 32 rotates at the contact position, thereby sending, to the feeding roller 33, the first medium 17*f* mounted at the medium mounting portion 22. After sending out the first medium 17*f*, the pick-up roller 32 sends out the second medium 17*s*.

The feeding roller 33 is brought into contact with the upper surface of the medium 17 sent out by the pick-up roller 32. That is, when multiple feeding occurs and a plurality of media 17 are sent by the pick-up roller 32 at one time, the feeding roller 33 is brought into contact with the uppermost first medium 17*f*. The feeding roller 33 sends the first medium 17*f* in the transport direction Dc.

The separation roller 34 nips the first medium 17*f* between the separation roller 34 and the feeding roller 33. The separation roller 34 is rotatable in a first rotational direction R1 and a second rotational direction R2 with the rotary shaft 42 being the center. The first rotational direction R1 is a direction used to send the first medium 17*f* in the transport direction Dc. The second rotational direction R2 is a direction opposite from the first rotational direction R1. The separation roller 34 is not fixed to the rotary shaft 42. Thus, the separation roller 34 is able to rotate in a sliding manner relative to the rotary shaft 42.

Figure 2:
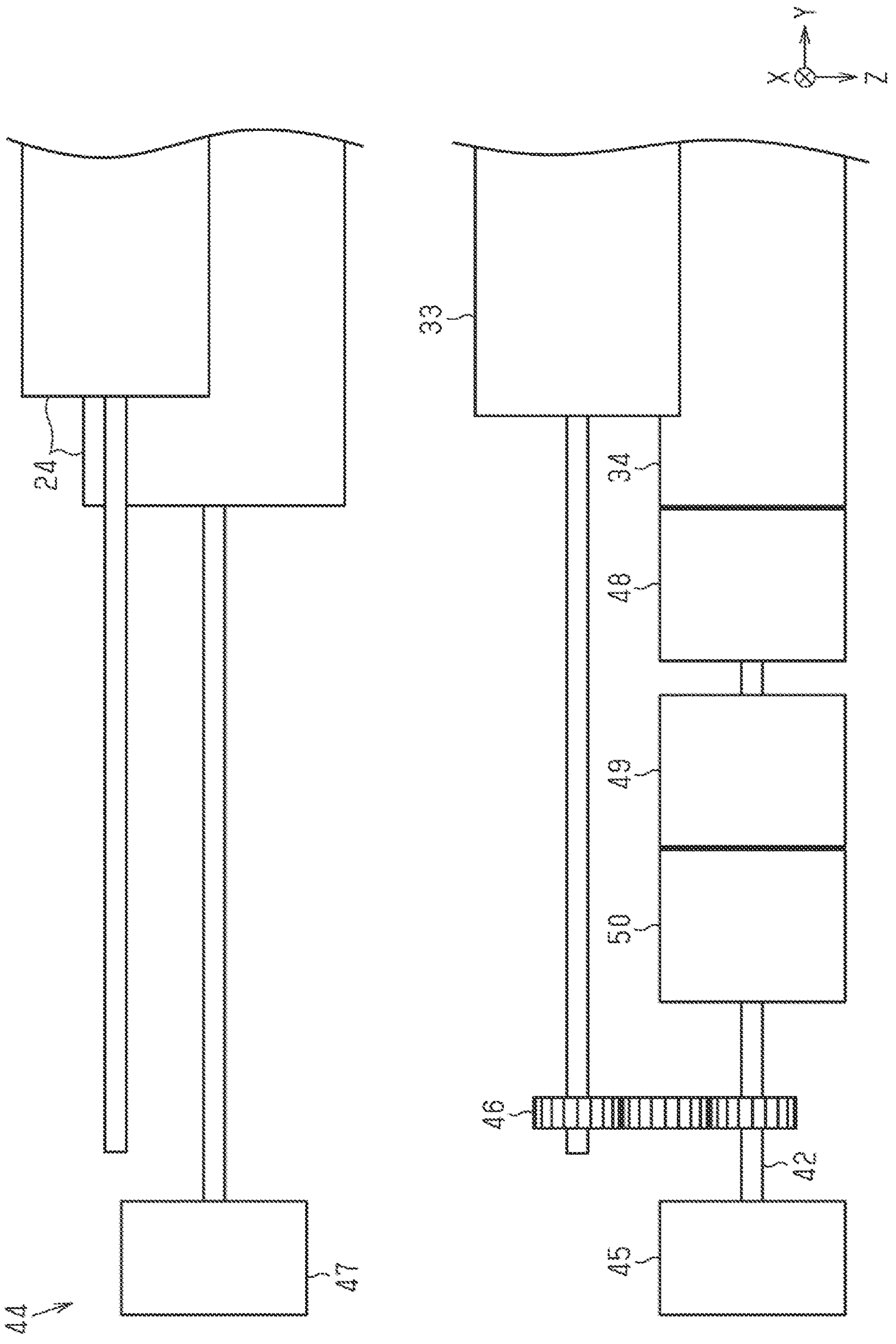
FIG. 2 is a schematic view illustrating a driving mechanism included in the recording device.

As illustrated in FIG. 2, the medium transport device 16 may include a driving mechanism 44. The driving mechanism 44 may include a first drive source 45 serving as one example of a drive source, a transmission unit 46, and a second drive source 47. The driving mechanism 44 may include a first torque limiter 48, a second torque limiter 49, and a one-way clutch 50.

The first drive source 45 may drive the separation roller 34. The first drive source 45 causes the rotary shaft 42 to drive in the second rotational direction R2, thereby rotating the separation roller 34 in the second rotational direction R2. That is, the rotary shaft 42 according to the present embodiment constitutes a transmission path used to transmit power of the first drive source 45 to the separation roller 34.

The transmission unit 46 transmits power of the first drive source 45 to the feeding roller 33. The transmission unit 46 may transmit driving force of the first drive source 45 to the pick-up roller 32 illustrated in FIG. 1. That is, the first drive source 45 may cause the rotary shaft 42, the feeding roller 33, and the pick-up roller 32 to rotate.

The second drive source 47 may drive a driving roller of the transport roller pair 24.

The first torque limiter 48 and the second torque limiter 49 may be provided at the rotary shaft 42. The first torque limiter 48 and the second torque limiter 49 may be provided at a transmission path used to transmit power of the first drive source 45 to the separation roller 34. The first torque limiter 48 and the second torque limiter 49 may be provided in the transmission path in series. That is, the first torque limiter 48 and the second torque limiter 49 may apply a rotational load to the rotary shaft 42 that constitutes the transmission path.

The first torque limiter 48 may be fixed to the rotary shaft 42. The first torque limiter 48 may rotate together with the rotary shaft 42. The first torque limiter 48 may apply a rotational load having a first load value to the separation roller 34. That is, when the separation roller 34 rotates in a manner differing from the rotary shaft 42, a rotational load having a first load value occurs between the first torque limiter 48 and the separation roller 34. When the separation roller 34 rotates in the same manner as the rotary shaft 42, the first torque limiter 48 does not apply a rotational load to the separation roller 34. The first load value may be set, for example, to 400 gfcm.

The second torque limiter 49 is fixed, for example, to a frame configured to support the rotary shaft 42. The second torque limiter 49 applies a rotational load having a second load value to the separation roller 34. The second torque limiter 49 according to the present embodiment applies the rotational load to the separation roller 34 through the one-way clutch 50 and the rotary shaft 42. The second load value is lower than the first load value. The second load value may be set, for example, to 200 gfcm.

The one-way clutch 50 switches coupling states of the rotary shaft 42 and the second torque limiter 49. The one-way clutch 50 couples the rotary shaft 42 rotating in the first rotational direction R1 and the second torque limiter 49. The one-way clutch 50 uncouples the second torque limiter 49 and the rotary shaft 42 rotating in the second rotational direction R2 from each other.

When the rotary shaft 42 rotates in the first rotational direction R1, the one-way clutch 50 rotates together with the rotary shaft 42. Thus, a rotational load having the second load value occurs between the one-way clutch 50 and the second torque limiter 49.

When the rotary shaft 42 rotates in the second rotational direction R2, the one-way clutch 50 causes the rotary shaft 42 to freewheel. That is, the second torque limiter 49 does not apply a rotational load to the rotary shaft 42 that rotates in the second rotational direction R2.

Operation of Embodiment

Operation of the present embodiment will be described.

In FIGS. 3 to 6, the solid-line arrow indicates a direction of rotation by drive of the first drive source 45 and the second drive source 47, and the dashed-line arrow indicates a direction of following rotation relative to the medium 17 and other rollers.

Figure 3:
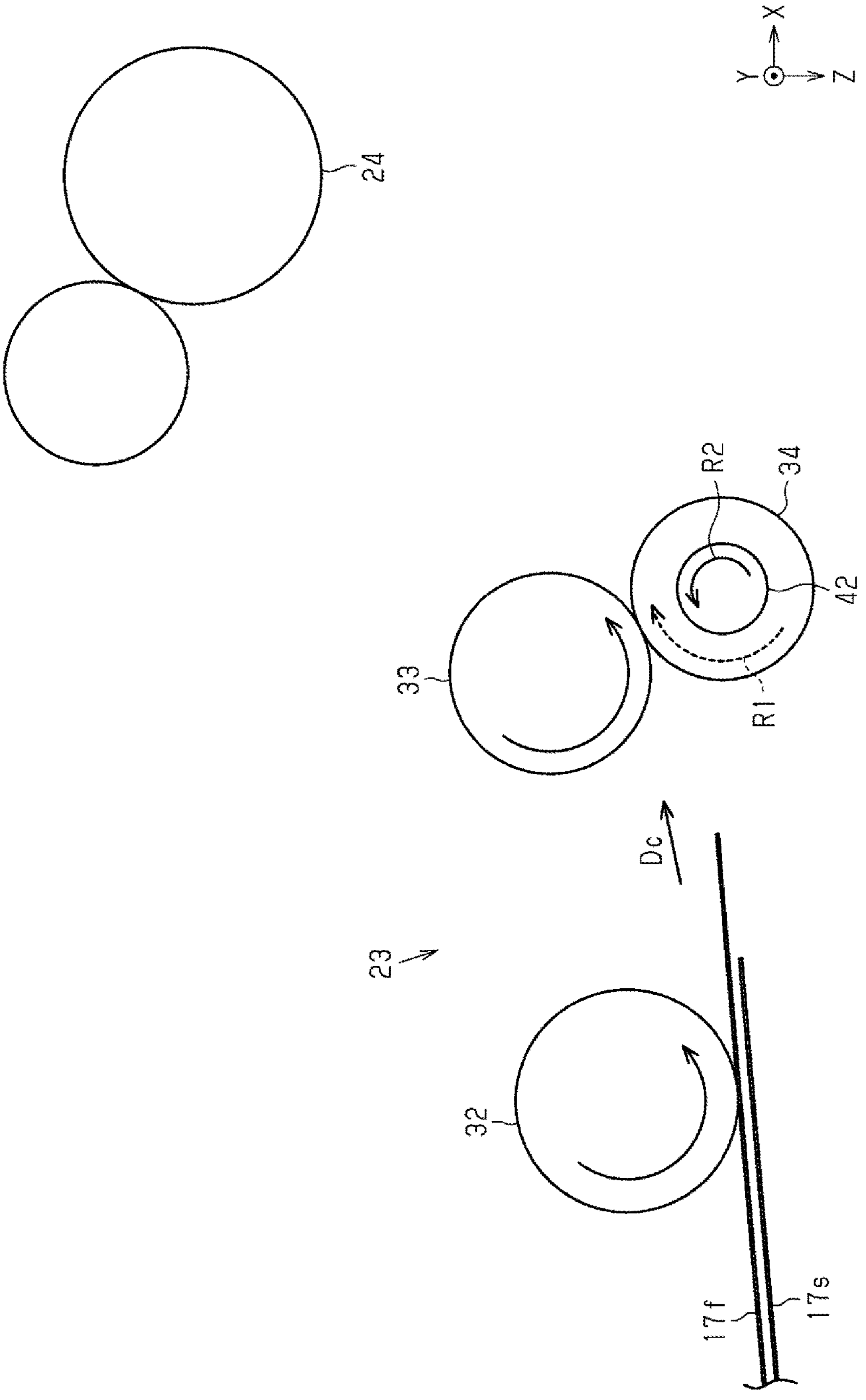
FIG. 3 is a schematic view illustrating a feeding mechanism and a transport roller pair.

When the medium 17 is fed as illustrated in FIG. 3, the control unit 15 causes the first drive source 45 to drive. The first drive source 45 causes the pick-up roller 32, the feeding roller 33, and the rotary shaft 42 to rotate. As the pick-up roller 32 located at the contact position rotates, the first medium **17*f*** is fed.

The rotary shaft 42 rotates in the second rotational direction R2. Before the first medium **17*f* reaches the feeding roller 33, the separation roller 34 follows the feeding roller 33 and rotates in the first rotational direction R1. The separation roller 34 rotates in a direction differing from the rotary shaft 42 that rotates in the second rotational direction R2, and hence, a rotational load is applied to the separation roller 34 through the first torque limiter 48. When the first drive source 45 operates, the one-way clutch 50 uncouples the second torque limiter 49 and the separation roller 34 from each other. Thus, the driving mechanism 44 applies a rotational load having the first load value to the rotation of the separation roller 34 in the first rotational direction R1**.

Figure 4:
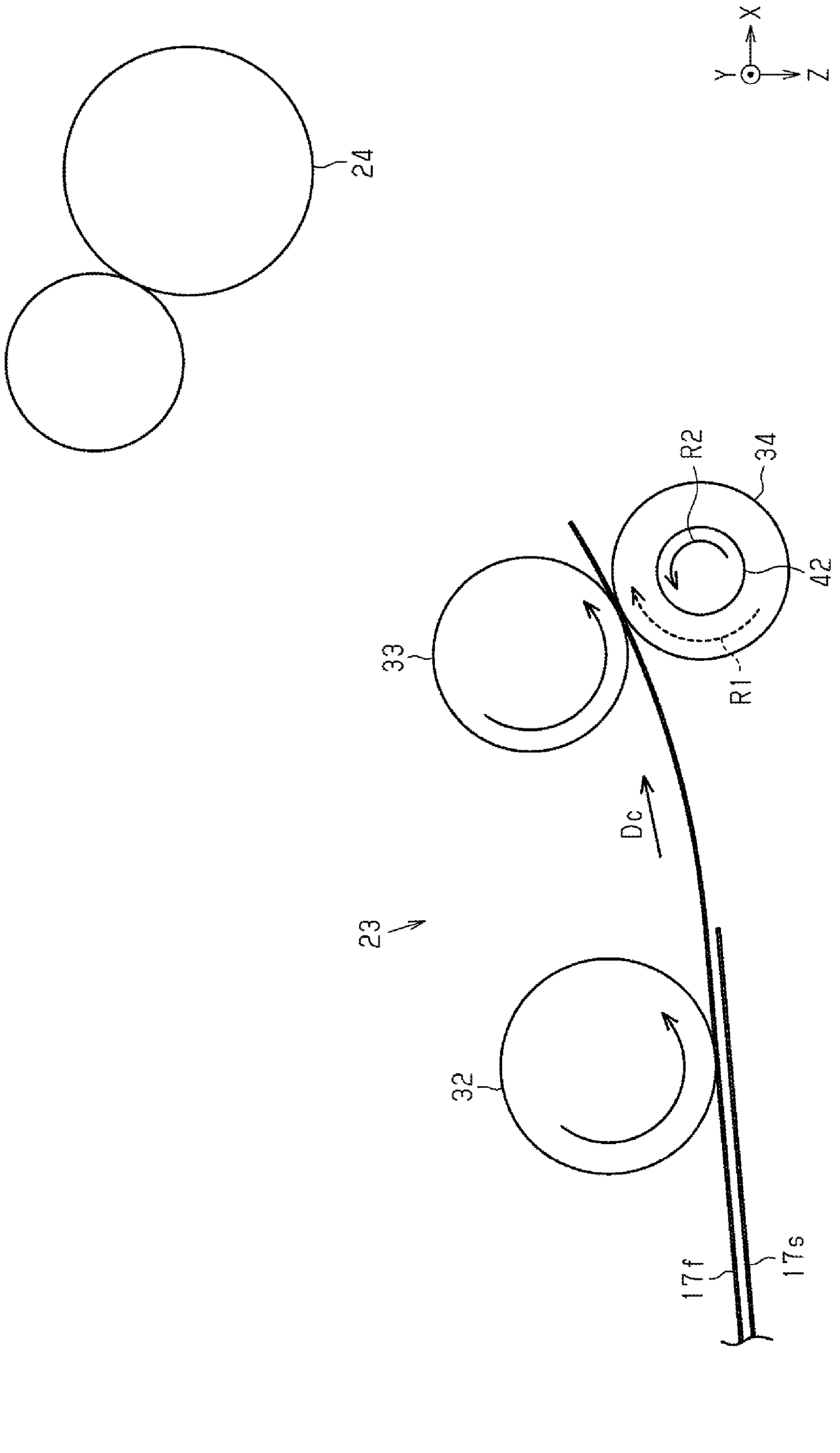
FIG. 4 is a schematic view illustrating the feeding mechanism and the transport roller pair.

When the first medium **17*f* reaches the feeding roller 33 as illustrated in FIG. 4, the feeding roller 33 and the separation roller 34 sandwich the first medium 17*f*. While the separation roller 34 follows the first medium 17*f* sent in the transport direction Dc, the rotational direction of the separation roller 34 remains unchanged and is the first rotational direction R1. Thus, the rotational load having the first load value is applied to the separation roller 34 by the first torque limiter 48**.

Figure 5:
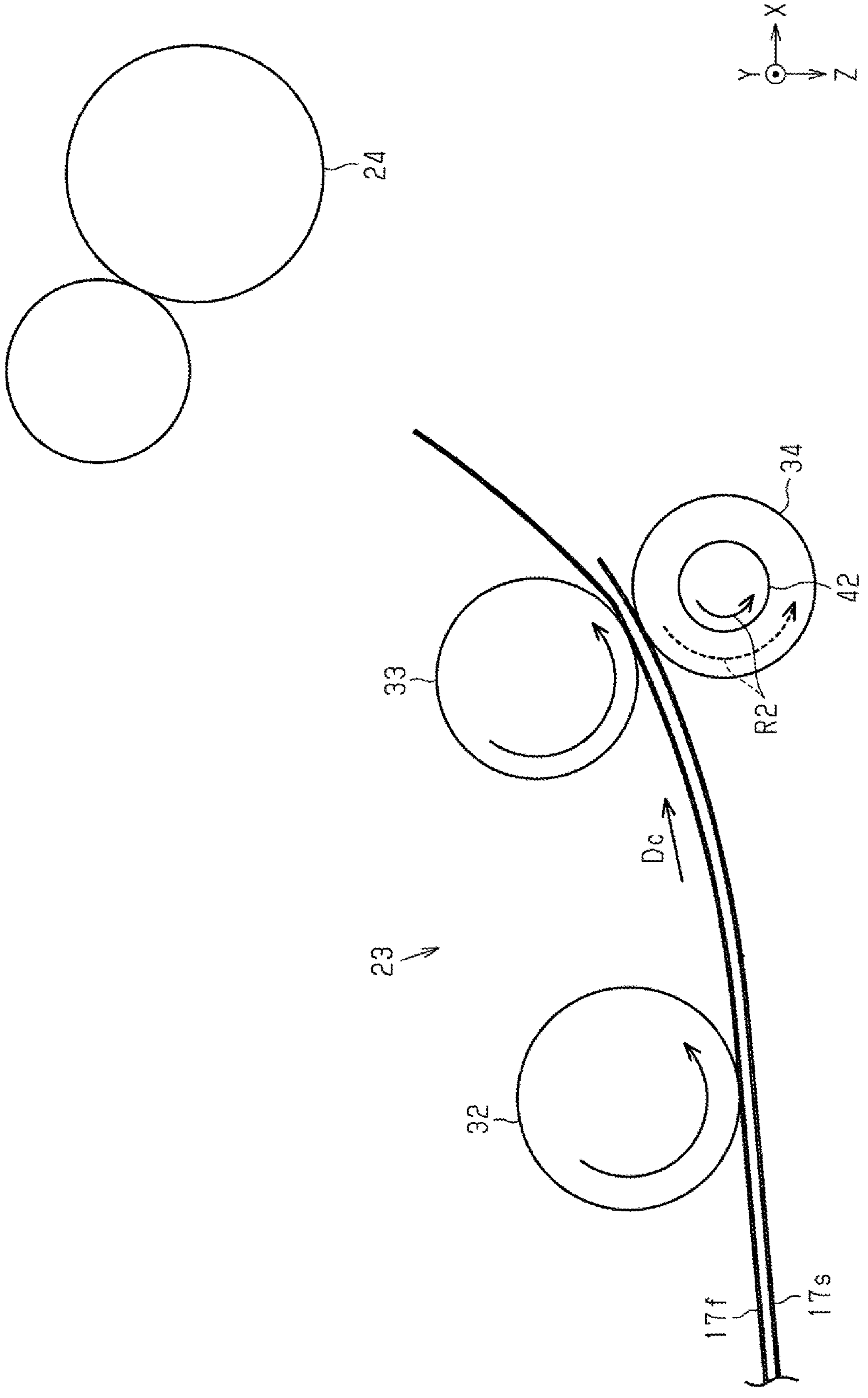
FIG. 5 is a schematic view illustrating the feeding mechanism and the transport roller pair.

The "multiple feed" represents that the second medium **17*s* is attached to the first medium 17*f*, and is sent as illustrated in FIG. 5. When the second medium 17*s* that is multiple fed reaches the separation roller 34, the separation roller 34 rotates in the second rotational direction R2 due to the load received from the first torque limiter 48, and pushes back the second medium 17*s*. The separation roller 34 separates the first medium 17*f* and the second medium 17*s*** from each other.

After the leading edge of the first medium **17*f* is transported to the transport roller pair 24, the control unit 15 may cause the second drive source 47 to drive. The control unit 15 may wait until skew of the first medium 17*f* having the leading edge coming into contact is corrected, and drive the second drive source 47. That is, the transport roller pair 24 may be a so-called resist roller configured to correct skew of the medium 17**.

Figure 6:
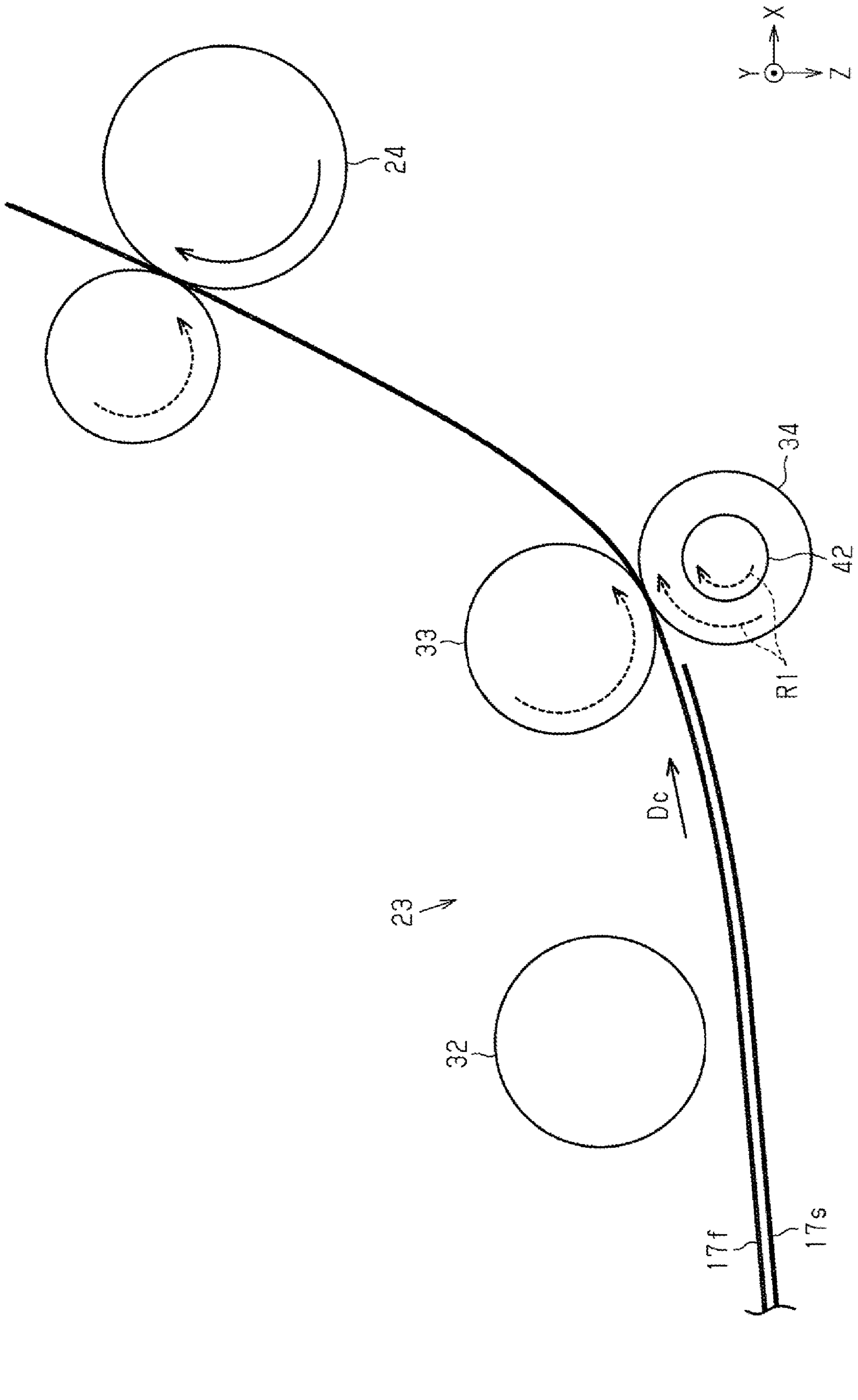
FIG. 6 is a schematic view illustrating the feeding mechanism and the transport roller pair.

As illustrated in FIG. 6, the control unit 15 may cause the pick-up roller 32 to move to the separated position in a state where the transport roller pair 24 is caused to transport the first medium 17f. The control unit 15 may stop the first drive source 45 in a state where the pick-up roller 32 is located at the separated position.

When the first drive source 45 stops, the feeding roller 33 and the separation roller 34 follow the first medium 17f sent by the transport roller pair 24. The rotary shaft 42 rotates in a following manner relative to the separation roller 34. That is, the separation roller 34 and the rotary shaft 42 rotate in the first rotational direction R1. When the first drive source 45 does not operate, the one-way clutch 50 couples the second torque limiter 49 and the separation roller 34. Thus, when the first drive source 45 stops, the rotational load applied to the separation roller 34 switches from the first load value to the second load value. Even when the second medium 17s is multiple fed, the separation roller 34 to which the rotational load having the second load value is applied is able to keep the second medium 17s staying there so as not to allow the second medium 17s to pass through the separation roller 34.

The pick-up roller 32 may move from the contact position to the separated position before the rotational load applied to the separation roller 34 switches from the first load value to the second load value. That is, the pick-up roller 32 may move to the separated position before the rotational load is switched, or may move to the separated position at the same time as the time when rotational load is switched.

The control unit 15 may stop the first drive source 45 from a time when the leading edge of the first medium 17f passes through the transport roller pair 24 and before the trailing edge of the first medium 17f passes through between the feeding roller 33 and the separation roller 34. In the present embodiment, when the first drive source 45 stops, the rotational load applied to the separation roller 34 switches from the first load value to the second load value. Before the leading edge of the first medium 17f reaches the transporting belt 27, the driving mechanism 44 may switch the rotational load applied to the separation roller 34 from the first load value to the second load value.

After the trailing edge of the first medium 17f passes through the feeding roller 33 and the separation roller 34, the control unit 15 causes the pick-up roller 32 to move to the contact position, and causes the first drive source 45 to drive to feed the second medium 17s.

Effects of Embodiment

Effects of the present embodiment will be described.

(1) The driving mechanism 44 that causes the separation roller 34 to drive switches the rotational load of the separation roller 34. Thus, it is possible to reduce the load of the transported medium 17 with a simplified structure while maintaining the separation performance for the medium 17.

(2) The driving mechanism 44 includes the first torque limiter 48 and the second torque limiter 49. The driving mechanism 44 can easily change the rotational load of the separation roller 34 by switching the torque limiter that applies the rotational load to the separation roller 34.

(3) The first torque limiter 48 and the second torque limiter 49 are provided in the transmission path in series. Thus, it is possible to simplify the structure, for example, as compared with a case where the first torque limiter 48 and the second torque limiter 49 are provided in parallel.

(4) The first torque limiter 48 and the second torque limiter 49 are provided at the same rotary shaft 42. This makes it possible to reduce the size of the driving mechanism 44 as compared with a case where the first torque limiter 48 and the second torque limiter 49 are provided separately.

(5) The driving mechanism 44 includes the one-way clutch 50. The one-way clutch 50 switches coupling of the second torque limiter 49 and the separation roller 34 in association with drive of the first drive source 45. This makes it possible to simplify the configuration of the driving mechanism 44.

(6) There is a possibility that the first medium 17f tilts when the rotational load applied to the separation roller 34 changes. In this regard, the driving mechanism 44 switches the rotational load applied to the separation roller 34 into the second load value before the leading edge of the first medium 17f reaches the transporting belt 27. Thus, it is possible to reduce the possibility that the first medium 17f on the transporting belt 27 tilts.

(7) When the rotational load applied to the separation roller 34 turns into the second load value, the pick-up roller 32 is located at the separated position. Thus, it is possible to reduce the load that the pick-up roller 32 applies to the first medium 17f.

MODIFICATION EXAMPLES

The present embodiment can be modified and implemented in the following manner. The present embodiment and the following modification examples can be combined with each other and be implemented as long as they do not technically contradict each other.

In addition to the rotary shaft 42, the first drive source 45 may rotate at least one of the pick-up roller 32, the feeding roller 33, the transport roller pair 24, the delivering roller pair 26, the pulley 28, and the ejecting roller pair 29.

The first load value and the second load value may be able to be changed, for example, in accordance with types of the medium 17. For example, when the media 17 are more likely to be separated from each other even when they are multiple fed, the first load value and the second load value may be set to lower values, as compared with a case where they are less likely to be separated from each other. For example, when the medium 17 has high stiffness, it may be possible to set the first load value and the second load value to lower values, as compared with a case where the medium has low stiffness. For example, when the width of the medium 17 is narrow, it may be possible to set the first load value and the second load value to lower values, as compared with a case where the width of the medium 17 is wide.

When drive of the first drive source 45 is stopped, the pick-up roller 32 may be located at the contact position.

The driving mechanism 44 may stop drive of the first drive source 45 after the first medium 17f reaches the transporting belt 27 and before the suction of the transporting belt 27 or before the recording unit 14 starts to perform recording on the first medium 17f.

It may be possible to employ, for example, a configuration in which the control unit 15 controls a clutch to switch the coupling state of the rotary shaft 42 and the second torque limiter 49.

At least either one of the first torque limiter 48 and the second torque limiter 49 may be provided at a position differing from the position of the rotary shaft 42.

At least either one of the first torque limiter 48 and the second torque limiter 49 may be provided so as to be in parallel with the transmission path. For example, the driving mechanism 44 may use a clutch to switch the transmission path of power, from a path passing through the first torque limiter 48 to a path passing through the second torque limiter 49, thereby changing the rotational load applied to the separation roller 34.

For example, the driving mechanism 44 may use a clutch to uncouple the first drive source 45 and the rotary shaft 42 from each other, thereby stopping driving the rotary shaft 42.

The driving mechanism 44 may include a braking unit configured to press a friction member against the rotary shaft 42 or the separation roller 34 to limit the rotation. The driving mechanism 44 may use a braking unit to switch the rotational load applied to the separation roller 34.

The recording unit 14 may be configured as a serial head that scans with respect to the medium 17. —The medium transport device 16 may be provided in a scanner including a reading unit configured to read an image on the medium 17.

The recording device 11 is not limited to an ink jet-type printer, and may be a laser printer, a thermal printer, a dot impact printer, a digital printing unit, or the like.

The recording device 11 may be a liquid jetting device that performs recording by jetting or discharging a liquid other than ink. States of the liquid discharged from the liquid jetting device as a droplet having a fine amount include a granular state, a tear drop state, and a thread state with a tail. The liquid as used herein is only necessary to be a material that can be jetted from the liquid discharging device. For example, it is only necessary that the liquid is a substance in a state of a liquid phase, and includes a liquid body having high or low viscosity, sol, gel water, or other fluid bodies such as an inorganic solvent, an organic solvent, a solution, a liquid resin, a liquid metal, or a metal melt. The liquid not only includes a liquid as one state of a substance, but also includes a substance obtained by dissolving, dispersing, or mixing of particles of a functional material formed of a solid material such as a pigment or metal particles in a solvent. A typical example of the liquid includes ink described in the embodiment above, liquid crystal, or the like. Here, the ink includes various liquid compositions such as general water-based ink, oil-based ink, gel ink, or hot melt ink. A specific example of the liquid jetting device includes a device that jets a liquid containing a material such as an electrode material or a color material in a dispersed or dissolved state, which is used in manufacturing or the like of a liquid crystal display, an electroluminescence display, a field emission display, or a color filter. The liquid jetting device may be a device configured to jet a bioorganic material used in manufacturing a bio chip, a device used as an accurate pipette and configured to eject a liquid serving as a sample, a printing machine, a microdispenser, or the like. The liquid jetting device may be a device configured to jet lubricant oil in a pinpoint manner to a precision machine such as a watch or a camera, or a device configured to jet a transparent resin solution such as an ultraviolet curing resin onto a substrate so as to form a micro half-spherical lens, an optical lens, or the like used in an optical communication element or the like. The liquid jetting device may be a device configured to jet an etching solution such as acid or alkali so as to etch a substrate or the like.

Definition

The expression "at least one" as used in the present description means "one or more" desired options. As one example, the expression "at least one" as used in the present description means "only one option" or "both of two options" when the number of options is two. As another example, the expression "at least one" as used in the present description means "only one option" or a "combination of two or more given options" when the number of options is three.

Supplementary Description

Below, description will be made of technical concepts as well as operation and effects thereof that are understood from the embodiments and modification examples that have been described above.

(A) A medium transport device includes: a medium mounting portion at which a first medium and a second medium are mounted; a feeding roller configured to send the first medium in a transport direction; a separation roller configured to nip the first medium between the feeding roller and the separation roller, and separate the first medium and the second medium; a transport roller pair configured to transport the first medium sent from the feeding roller; and a driving mechanism configured to drive the separation roller, in which the separation roller is rotatable in a first rotational direction in which the first medium is sent in the transport direction, and also in a second rotational direction that is opposite from the first rotational direction, the driving mechanism causes the separation roller to rotate in the second rotational direction, the driving mechanism applies a rotational load having a first load value to rotation of the separation roller in the first rotational direction, and switches, after a leading edge of the first medium passes through the transport roller pair and before a trailing edge of the first medium passes through between the feeding roller and the separation roller, a rotational load applied to the separation roller from the first load value to a second load value that is lower than the first load value.

With this configuration, the driving mechanism configured to drive the separation roller switches the rotational load of the separation roller. Thus, it is possible to reduce the load of the transported medium with a simplified structure while maintaining the separation performance for the medium.

(B) The medium transport device may be configured such that the driving mechanism includes: a drive source configured to drive the separation roller; and a first torque limiter and a second torque limiter provided in a transmission path configured to transmit power of the drive source to the separation roller, the first torque limiter applies a rotational load having the first load value to the separation roller, and the second torque limiter applies a rotational load having the second load value to the separation roller.

With this configuration, the driving mechanism includes the first torque limiter and the second torque limiter. The driving mechanism is able to easily change the rotational load of the separation roller by switching torque limiters that apply the rotational load to the separation roller.

(C) In the medium transport device, the first torque limiter and the second torque limiter may be provided in the transmission path in series.

With this configuration, the first torque limiter and the second torque limiter are provided in the transmission path in series. Thus, it is possible to simplify the structure, as compared, for example, with a case where the first torque limiter and the second torque limiter are provided in parallel.

(D) In the medium transport device, the second torque limiter may be provided at a rotary shaft together with the first torque limiter.

With this configuration, the first torque limiter and the second torque limiter are provided at the same rotary shaft. Thus, it is possible to reduce the size of the driving mechanism, as compared with a case where the first torque limiter and the second torque limiter are separately provided.

(E) The medium transport device may be configured such that the driving mechanism includes a one-way clutch, when the drive source operates, the one-way clutch uncouples the second torque limiter and the separation roller, and when the drive source does not operate, the one-way clutch couples the second torque limiter and the separation roller.

With this configuration, the driving mechanism includes the one-way clutch. The one-way clutch switches coupling of the second torque limiter and the separation roller in association with drive of the drive source. Thus, it is possible to simplify the configuration of the driving mechanism.

(F) The medium transport device may be configured such that a transporting belt configured to transport the first medium sent from the transport roller pair is provided, and before a leading edge of the first medium reaches the transporting belt, the driving mechanism switches a rotational load applied to the separation roller from the first load value to the second load value.

There is a possibility that the first medium tilts when the rotational load applied to the separation roller changes. In this regard, with this configuration, the driving mechanism switches the rotational load applied to the separation roller into the second load value before the leading edge of the first medium reaches the transporting belt. Thus, it is possible to reduce the possibility that the first medium on the transporting belt tilts.

(G) The medium transport device may be configured such that a pick-up roller configured to send the first medium mounted at the medium mounting portion to the feeding roller is provided, the pick-up roller is configured to be displaced between a contact position at which the pick-up roller is in contact with the first medium and a separated position at which the pick-up roller is separated from the first medium, and the pick-up roller moves from the contact position to the separated position before the rotational load applied to the separation roller switches from the first load value to the second load value.

With this configuration, when the rotational load applied to the separation roller turns into the second load value, the pick-up roller is located at the separated position. Thus, it is possible to reduce the load that the pick-up roller applies to the first medium.

(H) A recording device includes the medium transport device having the configuration described above, and a recording unit configured to perform recording on the first medium.

With this configuration, it is possible to provide effects similar to those of the medium transport device described above.

What is claimed is:

1. A medium transport device comprising:

a medium mounting portion at which a first medium and a second medium are mounted;

a feeding roller configured to send the first medium in a transport direction;

a separation roller configured to nip the first medium between the feeding roller and the separation roller, and separate the first medium and the second medium;

a transport roller pair configured to transport the first medium sent from the feeding roller; and a driving mechanism configured to drive the separation roller, wherein the separation roller is rotatable in a first rotational direction in which the first medium is sent in the transport direction, and also in a second rotational direction that is opposite from the first rotational direction, the driving mechanism causes the separation roller to rotate in the second rotational direction, the driving mechanism applies a rotational load having a first load value to rotation of the separation roller in the first rotational direction, and switches, after a leading edge of the first medium passes through the transport roller pair and before a trailing edge of the first medium passes through between the feeding roller and the separation roller, a rotational load applied to the separation roller from the first load value to a second load value that is lower than the first load value.

2. The medium transport device according to claim 1, wherein the driving mechanism includes:

a drive source configured to drive the separation roller; and a first torque limiter and a second torque limiter provided in a transmission path configured to transmit power of the drive source to the separation roller, the first torque limiter applies a rotational load having the first load value to the separation roller, and the second torque limiter applies a rotational load having the second load value to the separation roller.

3. The medium transport device according to claim 2, wherein the first torque limiter and the second torque limiter are provided in the transmission path in series.

4. The medium transport device according to claim 3, wherein the second torque limiter is provided at a rotary shaft together with the first torque limiter.

5. The medium transport device according to claim 3, wherein the driving mechanism includes a one-way clutch, when the drive source operates, the one-way clutch uncouples the second torque limiter and the separation roller, and when the drive source does not operate, the one-way clutch couples the second torque limiter and the separation roller.

6. The medium transport device according to claim 1 further comprising:

a transporting belt configured to transport the first medium sent from the transport roller pair, wherein before a leading edge of the first medium reaches the transporting belt, the driving mechanism switches a rotational load applied to the separation roller from the first load value to the second load value.

7. The medium transport device according to claim 1 further comprising:

a pick-up roller configured to send the first medium mounted at the medium mounting portion to the feeding roller, wherein the pick-up roller is configured to be displaced between a contact position at which the pick-up roller is in contact with the first medium and a separated position at which the pick-up roller is separated from the first medium, and the pick-up roller moves from the contact position to the separated position before the rotational load applied to the separation roller switches from the first load value to the second load value.

8. A recording device comprising:

the medium transport device according to claim 1; and a recording unit configured to perform recording on the first medium.

* * * * *